United States Patent [19]

Iwamoto

[11] Patent Number: 4,588,350

[45] Date of Patent: May 13, 1986

[54] ARTICLE TRANSPORTING APPARATUS

[75] Inventor: Taro Iwamoto, Hitachi, Japan

[73] Assignee: Hitachi, Ltd., Tokyo, Japan

[21] Appl. No.: 423,444

[22] Filed: Sep. 24, 1982

[30] Foreign Application Priority Data

Sep. 30, 1981 [JP] Japan ........................ 56-153709

[51] Int. Cl.[4] ........................ G21C 11/06

[52] U.S. Cl. ........................ 414/787; 414/146; 376/134; 376/146

[58] Field of Search ........................ 414/146, 150, 156, 180, 414/186, 223, 225, 10, 787; 376/134, 146; 254/122, 124

[56] References Cited

U.S. PATENT DOCUMENTS

| | | | |
|---|---|---|---|
| 408,152 | 7/1889 | Wellman | 414/186 |
| 4,330,369 | 5/1982 | Anderson | 414/146 X |
| 4,358,421 | 11/1982 | Jabsen | 414/146 X |
| 4,373,840 | 2/1983 | Miller, Jr. | 414/225 |

OTHER PUBLICATIONS

Proceedings of the 1st Topical Meeting on the Technology of Controlled Nuclear Fusion, vol. 1, 4/16/74–4/18/74, pp. 23-27, Hopkins et al.

Proceedings of the 7th Symp. on Eng. Pbs. of Fus. Res., Oct. 25-28, 1977, pp. 1444-1452, Werner.

Proceedings of the 28th Conference on Remote Systems Technology, vol. 2, 1980, pp. 20-25, Fuller.

*Primary Examiner*—Joseph E. Valenza
*Assistant Examiner*—David A. Bucci
*Attorney, Agent, or Firm*—Antonelli, Terry & Wands

[57] ABSTRACT

An article transporting apparatus for inserting an article into a port of a vessel and removing the article from the vessel through the port and for transporting the article in a direction transverse to the inserting and removing direction within the vessel. The apparatus includes a frame movable into and out from the vessel through the port, a parallel link mechanism mounted on the frame for transporting the article in a direction transverse to a direction of movement of the frame, a device for driving the parallel link mechanism, and a device for connecting the end of the parallel link mechanism to the article.

10 Claims, 9 Drawing Figures

ARTICLE TRANSPORTING APPARATUS

BACKGROUND OF THE INVENTION

The present invention relates to a transporting apparatus suitable for transporting articles and more particularly, for transporting divertor modules into and out of a nuclear fusion reactor.

In general, the interior of a nuclear fusion reactor is under a strong influence of radiation as a result of the fusion reaction, with level of the residual activity being high even after the stop of operation of the reactor, so that operators or engineers cannot enter into the reactor. Various maintenance and repair works, therefore, have to be made fully automatic. Accordingly the reactor should be designed to be easily maintained and repaired by remote control. Namely, the reactor has to be designed by taking into account the ease of maintenance and repair works by remote control. Among the constituents in the nuclear fusion reactor, the divertor, installed in a vacuum vessel to get rid of impurity ions in the reactor, is subjected to an extremely severe condition and hence has to be renewed or repaired within a short period of time. From this point of view, there have been several proposals in which the divertor is divided into a plurality of modules for the repair and/or the renewal thereof, as well as apparatus for effecting such renewal.

According to a first proposal, the vacuum vessel containing the divertor and a shield structure around the vacuum vessel are divided into a plurality of sections. The repair is made by shifting the shield structure sections to the repairing place. An example of this proposal is disclosed in, for example, "PROCEEDINGS OF THE 28TH CONFERENCE ON REMOTE SYSTEM TECHNOLOGY" America Nuclear Society, 1980. A disadvantage of the proposal resides in the fact that, in shifting of the structure section together with the diverter module, since the structure section is extremely heavy, the shifting requires a large amount of energy. Consequently, this proposal does not seem to be readily realized.

According to a second proposal, a repairing machine is brought into the vacuum vessel and the divertor module is repaired in the vacuum vessel; however, this proposal can hardly be put into practice because of the problems concerning the radio resistance and reliability of the repairing machine.

According to a third proposal, the divertor module is put into and out from the vacuum vessel through a maintenance port or window formed in the wall of the vacuum vessel. This proposal affords an efficient operability when the divertor module is shifted only linearly through the port. In this method, in order to effect a linear shifting of the divertor module it is necessary for the number of the divided divertor modules to be equal to the number of toroidal field coils. Consequently, the size of the modules becomes larger, so that a greater space is required between adjacent coils for shifting the modules through the space. This in turn requires the toroidal field coil to have an impractically large diameter. The reactor to be applied with this method is restrained of its size. In addition, this method cannot be applied to the reactor in which two divertor units are respectively arranged in upper and lower portions of the interior of the vacuum vessel as a so-called "double divertor type". Thus, this proposal is also impractical because it deteriorates the performance of the reactor and increases the size of the same.

In order to avoid the problems encountered in the above proposals it has further been proposed to divide the divertor into a number of modules which is greater than that of the toroidal field coils, thereby reducing the size of each module and a module group consisting of at least three modules replaced through a maintenance port. According to this proposal, the divertor modules should be circumferentially moved around the center of the reactor within the vacuum vessel. To this end, additional equipment is required to readily effect the circumferential shift of the modules in the vacuum vessel with certainty.

SUMMARY OF THE INVENTION

Accordingly, it is an object of the present invention to provide an article transporting apparatus which is suitable for transporting an article to be put into and out from the container or a vessel in one direction through a port formed in the wall of the vessel and also in a second direction transverse to the direction of the movement of the article through the port.

Another object of the present invention resides in providing a simple article transporting apparatus which can transport the article reliably in the second direction.

A further object of the present invention resides in providing an article transporting apparatus suitable for transporting divertor modules of a nuclear fusion reactor into and out from the reactor.

According to advantageous features of the present invention, an article transporting apparatus is provided for inserting an article through a port in a vessel and removing the article from the vessel through the port and for transporting the article in a direction transverse to the inserting and removing direction within the vessel.

The article transporting apparatus of the present invention includes a frame movable into and out from the vessel through the port along the inserting and removing direction carrying and guiding the article, with a parallel link means being mounted on the frame and being adapted to transport the article in a direction transverse to the direction of movement of the frame. A driving means is provided between the parallel link means and the frame in order to drive the parallel link. A connecting means is provided at the end of the parallel link means for connecting the end of the parallel link means to the article.

These and other objects, features and advantages of the present invention will become more apparent from the following description of the preferred embodiments taken in conjunction with the accompanying drawings.

DETAILED DESCRIPTION

Figure 1:
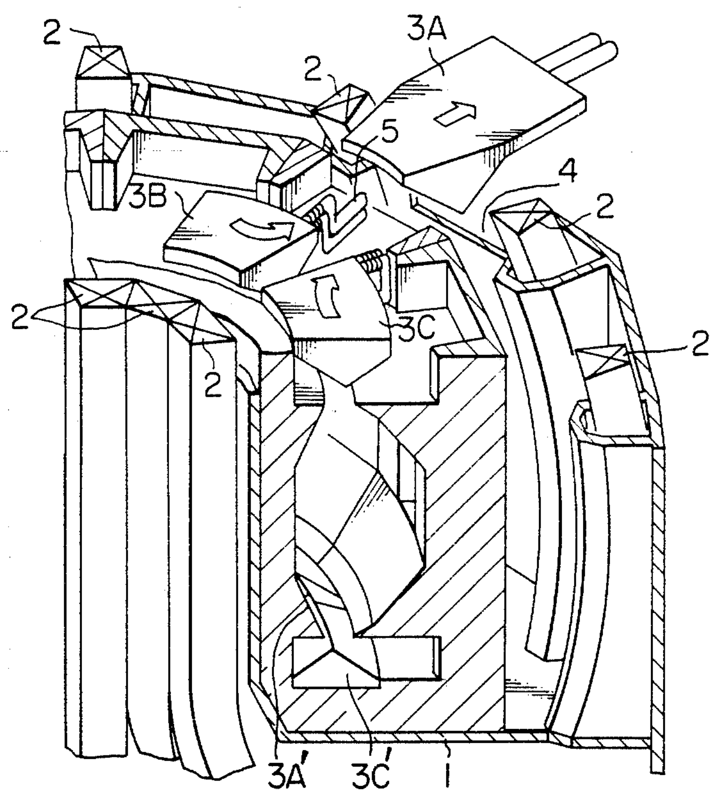
FIG. 1 is a partly-sectional fragmentary perspective view of a nuclear fusion reactor equipped with an article transporting apparatus in accordance with the present invention.
Figure 2:
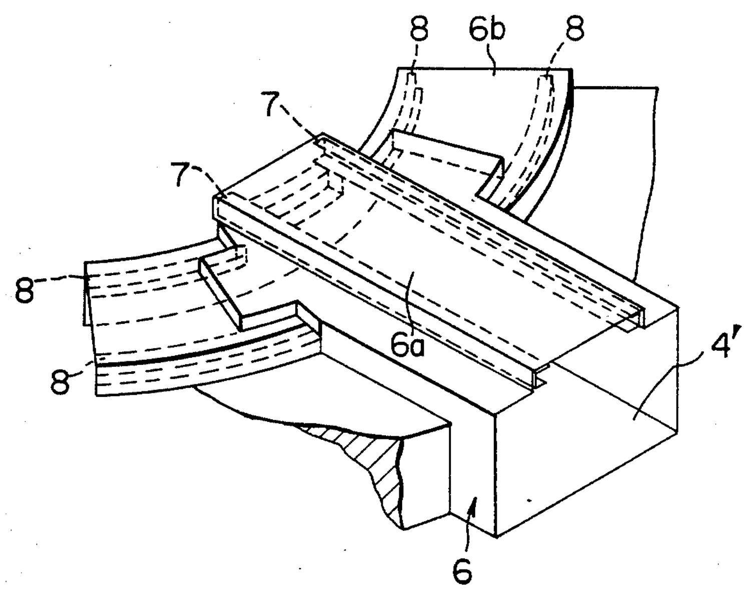
FIG. 2 is a fragmentary perspective view showing a guide structure of an article transporting apparatus in accordance with the present invention.

Referring now to the drawings when like reference numerals are used throughout the various views to designate the like parts and, more particularly, to FIG. 1, according to this figure a Tokamak fusion reactor has a torus-shaped vacuum vessel 1 and toroidal field coils 2 each surrounding a peripheral portion of the vacuum vessel 1. Divertor modules 3A to 3C to be replaced are removable from their positions in the vacuum vessel 1 to the outside of the reactor through a maintenance port 4 formed in the outer wall of the vacuum vessel and a space between the peripheral adjacent toroidal field coils 2, 2 and new divertor modules to be replaced are put into and mounted in the reactor in the reverse procedure. Among these three divertor modules, only the central divertor module 3A can be put into and out from the reactor solely by a radial linear movement through the maintenance port 4, but the divertor modules 3B, 3C at both sides have to be first moved circumferentially around the axis of the reactor into radial alignment with the maintenance port 4 and then moved radially straight to the outside of the reactor through the maintenance port. Water conduits 5 for cooling the divertor modules 3A to 3C are connected thereto. Similarly, three divertor modules are disposed at the lower portion of the interior of the vacuum vessel 1, although for the sake of clarity only divertor modules 3A' and 3C' are illustrated in the drawing As shown in FIG. 2, a guide structure for guiding the article transporting apparatus includes. a guide framework 6 having an inlet port 4', with the guide framework 6 being composed of a radial frame **6*a* and a circumferential frame 6*b*. The radial frame 6*a* is provided with radially extending guideways 7 carrying the divertor modules 3A to 3C and divertor transporting apparatus and guiding the movements thereof. On the other hand, the circumferential frame 6 is provided with circumferential guideways 8 for circumferentially guiding the divertor modules 3A to 3C. The circumferential guideways 8 are positioned at a level lower than that of the radially extending guideways 7 so that they do not interesect a plane containing the radially extending guideways 7. Each circumferential guideway 8 is cut to provide a circumferential discontinuity at a portion thereof between two radially extending guideways 7, 7**.

Figure 3:
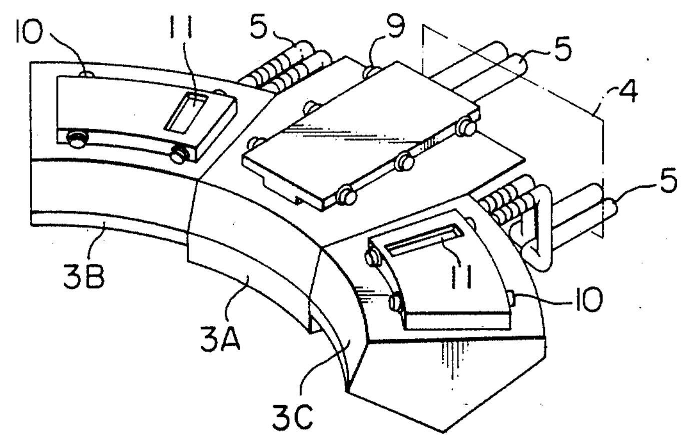
FIG. 3 is a perspective view of divertor modules handled by an article transporting apparatus in accordance with the present invention.

As shown in FIG. 3, the divertor to be put into and removed from vacuum vessel through a single maintenance port 4 comprises three divertor modules, namely, a central divertor module 3A and side divertor modules 3B, 3C. Wheels 9 are rotatably mounted on a surface of the central divertor module 3A not facing to the working space of the reactor and permit the module 3A to move along the radially extending guideways 7. The divertor modules 3B, 3C, disposed at respective sides of the central divertor 3A, are provided with wheels 10 so that the divertor modules 3B, 3C can move along the circumferential guideways 8. The wheels 9 of the divertor module 3A are located above the wheels 10 of the divertor modules 3B, 3C by a height difference corresponding to that between the circumferential guideways 8 and the radial guideways 7, white the two divertor modules 3B, 3C are at the same level. Each of the side divertor modules 3B, 3C is provided on its surface not facing to be working space of the reactor with a radially extending straight groove 11. The straight grooves 11 are adapted to be engaged with a portion of a shifting device, described more fully hereinbelow to shift the divertor modules 3B, 3C in the circumferential direction. Cooling water conduits 5 connected to the divertor modules 3A to 3C, respectively, are lead to the outside of the vessel through the maintenance port 4.

Figure 4:
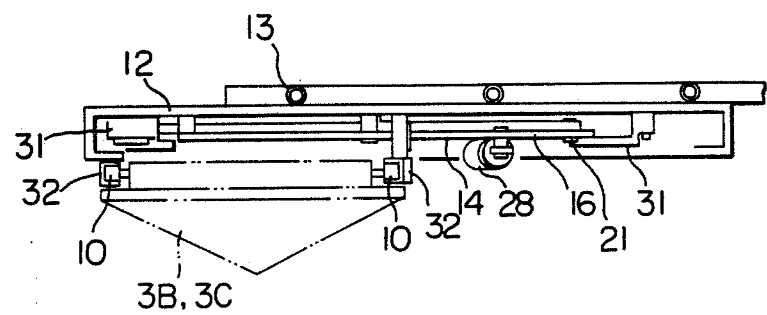
FIG. 4 is a side elevational view of an article transporting apparatus in accordance with an embodiment of the present invention.
Figure 5:
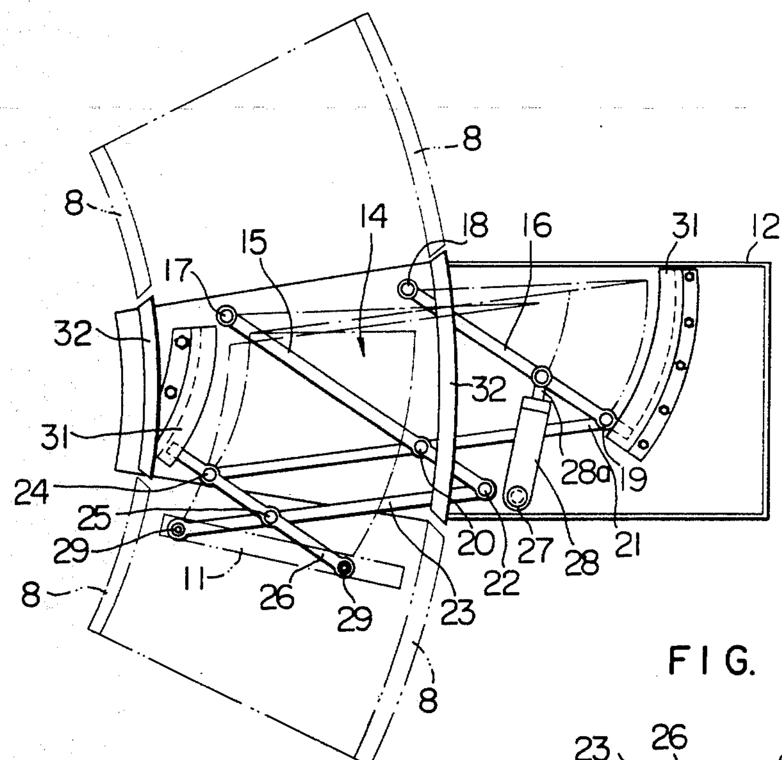
FIG. 5 is a bottom view of the apparatus shown in FIG. 4.
Figure 6:
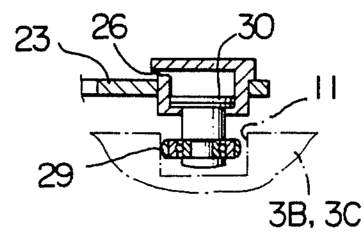
FIG. 6 is a vertical sectional view showing a connecting between a parallel link mechanism of the article transporting apparatus shown in FIG. 4 and a divertor module.

FIGS. 4 and 5 provide an illustration of the manner in which the article transporting apparatus functions for shifting the divertor modules 3B, 3C in the circumferential direction, because the central divertor module 3A can be inserted along a straight path into and out from the vacuum vessel simply along the radial guideways 7. The transporting apparatus has a frame 12 which is provided on the upper surface thereof with wheels 13 adapted to be guided by the radial guideways 7. A parallel link means 14 is secured to the lower surface of the frame 12, with the parallel link means 14 including a first link 15 and a second link 16 which are pivotally secured at their one ends to the frame by pins 17, and 18, so that the links 15, 16 are respectively swingable around the pins 17, 18. A third link 21 is connected at opposite ends through pins 19, 20 to a portion of the second link 16 adjacent to the other end thereof and to a portion of the first link 15 spaced from the other end thereof. A forth link 23 is pivotally connected at its one end to the other end of the first link 15. A fifth link 26 is connected through pins 24, 25 to one end of the third link 21 which is connected to the other end portion of the second link 16 by the pin 19 and also to a portion of the fourth link 23 spaced from the end thereof. Thus, the links 15, 16, 21, 23 and 26 are pivotally connected through various pins in such a manner that the links 15, 16 and 26 are held in parallel with one another while the links 21 and 23 are held in parallel with each other. A drive cylinder 28 is pivotally secured through a pin 27 to the frame 12 and has a piston rod **28*a* one end of which is connected to the second link 16. Rollers 29 provided on the other end of the fourth link 23 and, on one end of the fifth link 26, are adapted to be received by the grooves 11 formed in the divertor modules 3B, 3C. As shown in FIG. 6, the rollers 29 are moved upward and downward by a hydraulically driven piston 30 to disengage and engage with the groove 11. The other ends of the second link 16 and the fifth link 26 are slidably held by link supports 31, 31 which are fixed to the frame 16 in order to bear the link means 14. Arcuate guideways 32, provided on a bottom portion of the frame 12, are adapted to carry the divertor modules 3B, 3C and to guide the circumferential movement thereof. When the transporting apparatus is inserted forward along the radial guideways 7 to the innermost position shown in FIG. 2, the guideways 32 are brought into alignment with the circumferential guideways 8** of the circumferential frame $6b$ thereby form a series of circumferential guideways.

The parallel link means 14 rotates around a virtual center of rotation to drive the divertor modules 3B, 3C in the circumferential direction, in accordance with a principle explained hereinbelow.

Figure 7:
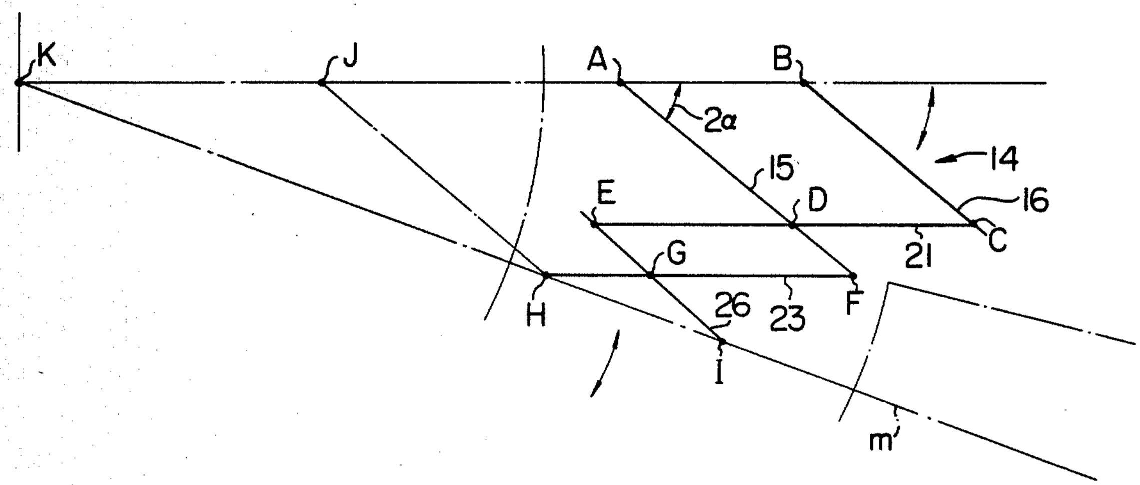
FIG. 7 is a diagramatical illustration of the principle of operation of the parallel link mechanism in the article transporting apparatus of the present invention.

Referring to FIG. 7, the points of pivotal connection of the links 15, 16, 21, 23 and 26 are represented by symbols A to I. When the second link 16, having a link segment $\overline{BC}$, is swung around the fulcrums B, if a fixed point K exists constantly on an extension of a line segment m interconnecting the points H and I, the line segment m may rotate around the fixed point K. Therefore, if the fixed point K coincides with the center of the reactor and the divertor module is moved by means of the rollers provided in the two points H and I, the divertor module may be moved in a circumferential direction with it constantly facing in the same direction against the center of the reactor. It is assumed that the points A to I of pivotal connection are determined to meet the following conditions (1) to (3).

$$\overline{AB}//\overline{CE}//\overline{FH} \quad (1)$$

$$\overline{BC}//\overline{AF}//\overline{EI} \quad (2)$$

$$\overline{GH}=\overline{GI} \quad (3)$$

where an angle DAB is given by $$\angle DAB=2\alpha \quad (4)$$

The following formula is derived from the formulae (1) and (2).

$$\angle IGF=\angle DAB=2\alpha \quad (5)$$

Since, as apparent from formula (3), the triangle defined by points H, G and I is an isosceles triangle, the following formula is derived.

$$\angle IHG=\angle IGF/2=\alpha \quad (6)$$

A point J is defined as a point of intersection between the extension of the segment $\overline{AB}$ and a line being parallel to the segment $\overline{AF}$ and passing through a point H, while a point K is defined as a point of intersection between the extension of the segment $\overline{HI}$ and the extension of the segment $\overline{AB}$. The following formula (7) is derived.

$$\angle HJA=\angle FAB=2\alpha \quad (7)$$

From the formula (1) the following formula (8) is derived.

$$\angle GHJ=\angle FAJ=\pi-2\alpha \quad (8)$$

The following formula (9) is obtained from formulae (6) and (8).

$$\angle KHJ=\pi-\angle GHJ-\angle IHG=\alpha \quad (9)$$

From the formulae (7) and (9), the following formula (10) is obtained.

$$\angle HKJ=\pi-\angle HJK-\angle KHJ=\angle HJA-\angle KHJ=\alpha \quad (10)$$

Therefore, the triangle defined by points H, I and J is an isosceles triangle, so that the following formulae (11) and (12) are derived by taking account of the formulae (1) and (2).

$$\overline{JK}=\overline{HJ}=\overline{AF} \quad (11)$$

$$\overline{AJ}=\overline{FH} \quad (12)$$

The following relationship is then derived from the formulae (11) and (12).

$$\overline{AK}=\overline{AJ}+\overline{JK}=\overline{AF}+\overline{FH} \quad (13)$$

Thus, the length between the points A and K corresponds to the sum of the length of the segment AF of first link 15 and the length of the segment HF of the fourth link 23 and is a constant value. It will be seen that the line passing through the points H and I passes the fixed point K irrespective of the value of the angle $\alpha$, however, the length $\overline{KH}$ is changed.

Therefore, according to the present invention, guideways 8, 32 are provided for permitting the divertor modues to move along arcuate path around the center K of the reactor and the points H and I of the parallel link mechanism 14 are engaged with the divertor modules 3B, 3C in such a manner that these points H and I may move in the modules in the radial direction. If the parallel link means 14 is moved so as to vary a value of the angle ∠ DAB, the divertor modules 3B, 3C are moved along the acruate path around the center K of the reactor.

An explanation will be made hereinunder as to how the divertor modules 3B, 3C are put into and removed from by means of the transporting apparatus of the present invention.

Before removing the two divertor modules 3B, 3C, the central divertor module 3A is removed from the reactor through the port 4. This can be easily carried out by removing the central divertor module 3A along the radial guideways 7.

Figure 8:
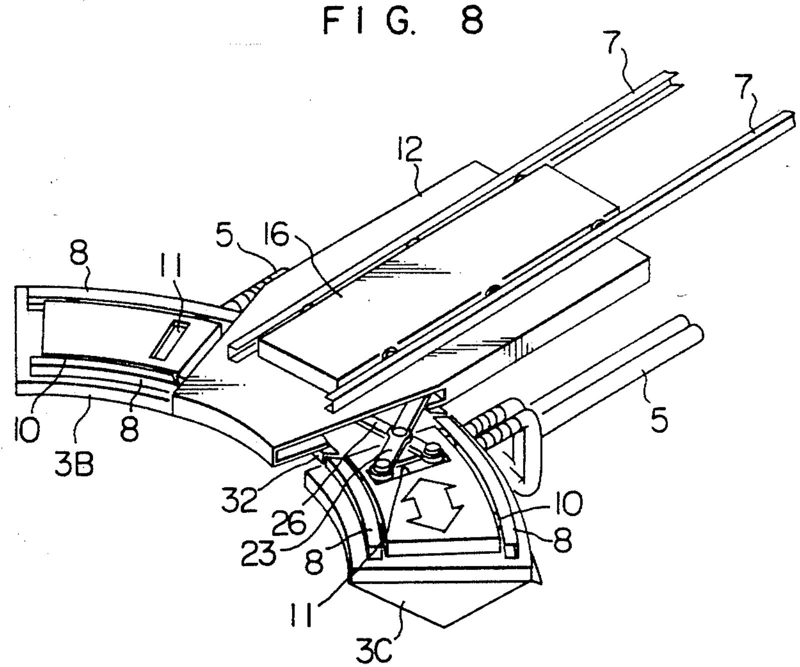
FIG. 8 is a perspective view of the article transporting apparatus of the present invention in the operating state.

Then, a tansporting apparatus having the parallel link means 14 is inserted along the radial guideways 7 of the guide frame 6 to the innermost portion of the guide frame 6. Then, the piston rod 28*a* of the drive cylinder 28 is retracted to stretch the parallel link means 14 in the circumferential direction. Then, as shown in FIGS. 5, 6 and 8, the rollers 29, 29 on the other end of the fourth link 23 and one end of the fifth link 26, respectively, are projected downwardly by the pistons 30 into engagement with the grooves 11. Subsequently, the piston rod 28*a* of the drive cylinder 28 is extended outwardly, so that the parallel link means 14 is folded, as shown by dashed line in FIG. 5, and the divertor module 3C is plate into the frame 12 of the transporting apparatus by the rollers 29. As the transporting apparatus is removed through the maintenance port 4 as it is, the divertor module 3C is removed from the reactor while being held by the arcuate guideways 32. For putting a new divertor module into the reactor a procedure reverse to that described above is carried out.

The other side divertor module 3B is placed into and removed from the reactor by another transporting apparatus which is separate from the first-mentioned apparatus and incorporates a parallel link means which is symmetrical with the first-mentioned means 14.

Figure 9:
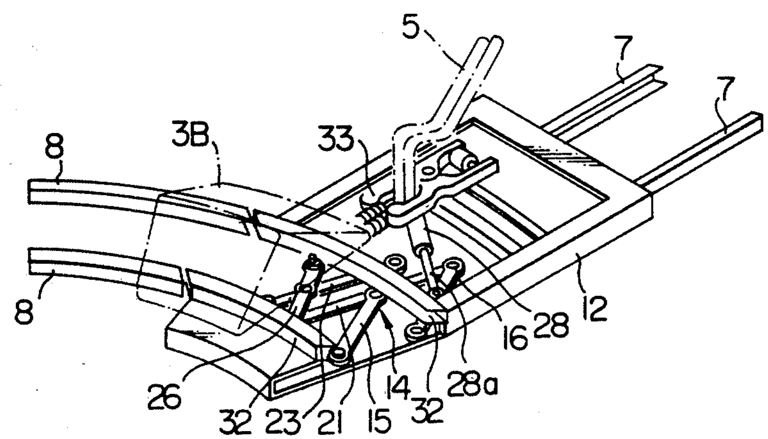
FIG. 9 is a perspective view illustrating the operation of the article transporting apparatus of the present invention for transporting a lower divertor unit out from a reactor.

The lower divertor modules placed in a lower portion of the interior of the vacuum vessel 1 can be placed into and removed from the vessel in the same manner as the upper divertor modules, as will be seen from FIG. 9.

The frame 12 is provided with a pipe bender 22 for bending the cooling water conduits 5. The pipe bender 33 serves to bend the cooling water conduits 5 to enable them to clear the maintenance port 4 when the divertor modules 3B, 3C are placed into and removed from the vacuum vessel through the maintenance port 4.

As will be understood from the foregoing description, according to the present invention it is possible to conduct a replacement of the articles safely and surely by a remote control. In particular the present invention preferably may be applied to the replacement of the divertor modules in the reactor in which the level of radiation is so high that the replacement and/or repair may not be conducted.

What is claimed is:

1. An article transporting apparatus for inserting an article into a port of a vessel and removing said article from said vessel through said port and for transporting said article in a direction transverse to said inserting and removing direction within said vessel, said apparatus comprising:

- a frame movable into and out of said vessel through said port along said inserting and removing direction and provided with guide means carrying and guiding said article;
- a parallel link means mounted on said frame and adapted to transport said article in a direction transverse to the direction of movement of said frame;
- a driving means provided between said parallel link means and said frame in order to drive said parallel link means; and
- a connecting means provided at the end of said parallel link means for connecting the end of said parallel link means to said article.

2. An article transporting apparatus according to claim 1, wherein said parallel link means is adapted to shift said article to a right side of a path of movement of said frame.

3. An article transporting apparatus according to claim 1, wherein said parallel link means is adapted to shift said article to a left side of a path of movement of said frame.

4. An article transporting apparatus according to one of claims 2 or 3, wherein said parallel link means includes a pantograph type link mechanism.

5. An article transporting apparatus according to one of claims 2 or 3, wherein said connecting means includes a groove provided in said article, rollers for engaging with said groove, and an actuator provided on the end of said parallel link means to engage and disengage said roller with said groove.

6. An article transporting apparatus for inserting an article into a port in a vessel and removing said article from said vessel through said port and for transporting said article in a direction transverse to said inserting and removing direction within said vessel, said apparatus comprising:

- a guide means provided in said vessel and extending from said port into an interior of said vessel;
- a frame having wheels adapted to be guided by said guide means and adapted to be moved into and out of said vessel by means of an engagement between said wheels and said guide means, said frame further having a guide which is adapted to be aligned with a transverse guide means mounted in said vessel for guiding the movement of said article in transverse directions, and which caries said article;
- a parallel link means mounted on said frame and adapted to transport said article in a direction transverse to the direction of movement of said frame;
- a driving means provided between said parallel link means and said frame in order to drive said parallel link means; and
- a connecting means provided at the end of said parallel link means for connecting the end of said parallel link means to said article.

7. An article transporting apparatus according to claim 6, wherein said parallel link means is adapted to shift said article to a right side of a path of movement of said frame.

8. An article transporting apparatus according to claim 6, wherein said parallel link means is adapted to shift said article to a left side of a path of movement of said frame.

9. An article transporting apparatus according to one of claims 7 or 8, wherein said parallel link means includes a pantograph type link mechanism.

10. An article transporting apparatus according to one of claims 7 or 8, wherein said connecting means includes a groove formed in said article, rollers for engaging with said groove, and an actuator provided on the end of said parallel link means to engage and disengage said rollers with said groove.

* * * * *